3,328,234
BONDING ANIONIC FIBERS TO ANIONIC AND
NON-IONIC MATERIALS BY TREATING THE
FIBERS WITH A CATIONIC ALTERING RESIN
CONTAINING AN OXIRANE RING
John C. Williams, Meriden, Conn., assignor to Hawley
Products Company, St. Charles, Ill., a corporation of
Delaware
No Drawing. Filed Jan. 7, 1965, Ser. No. 424,114
12 Claims. (Cl. 162—165)

This application is a continuation-in-part of my application Ser. No. 129,517 filed Aug. 7, 1961.

This invention relates to the treatment of water dispersed anionic fibers, such as, for example, cellulose, in the manufacture of paper, moldings containing such fibers, wall board, and other fibrous articles. It is especially concerned with the beater addition of resins to such fibers.

It is well known that many resins, including polyester resins, polystyrene resins and other hydrocarbon resins which are non-ionic or anionic, do not have an affinity for anionic fibers, such as cellulose. This lack of affinity is particularly evident when attempts are made to affix such resins to cellulose fibers in an aqueous slurry or in other processes where water is present.

Many proposals have heretofore been made to add resins to cellulose fibers in the beater. Attempts have been made to add the resins as such but usually they are added in the form of emulsions. The use of emulsions is undesirable because of the presence of emulsifying agents which often have adverse effects in the subsequent treatment of the fibers. It has also been proposed to precipitate resins on cellulose fibers, for example, an alkaline solution of a phenolic resin can be added to a water dispersed fiber and the phenolic resin can be precipitated by adding an acid.

One of the objects of the present invention is to provide a new and improved method of adding resins to cellulose and similar fibers by a beater addition wherein the resin is added in a solvent solution of an organic solvent and the fiber is altered so that it will accept both anionic and hydrocarbon resins directly from the organic solvent solution without the necessity for emulsification or precipitation.

Another object is to provide a new and improved treatment for cellulose and other anionic fibers which renders such fibers oil wetting. Other objects will appear hereinafter.

In accordance with the invention a process is provided whereby anionic fibers, preferably cellulose, in a water dispersed state are bonded to anionic and non-ionic resinous materials which do not normally bond to such fibers by treating such fibers dispersed in an aqueous slurry with a minor amount by weight of the fibers, preferably 0.5 to 7.5%, of a cationic hydrophilic altering resin containing an oxirane ring capable of reacting with the anionic fibers, said altering resin being from the group consisting of (1) an epoxidized precondensate of a polyamine containing at least four carbon atoms and a polyepoxide having an epoxide equivalent of at least 43, which epoxidized precondensate has a nitrogen content of at least 9% by weight and (2) condensation products of (1) with at least one mole of formaldehyde per mole of said polyamine, effecting intimate dispersion and reaction of said fibers with said altering resin, thereafter adding a non-aqueous non-emulsified fluid form of at least one such resinous material to the resultant aqueous slurry of altered fibers and intimately mixing said resinous material with said altered fibers to cause said resinous material to be bonded to said altered fibers, and then felting an article from said slurry.

The term "altering resin" as used herein refers to a resin which will alter the cellulose so that it will have an affinity for anionic resins, such as the polyester resins and for non-ionic resins, such as polystyrene resins, polybutene resins, and other hydrocarbon resinous materials. The preferred altering resins are hydrophilic, that is to say, they are soluble or dispersible in water. They preferably also form thickened solutions. In other words, the condensation reaction used in making the resin is carried out to the point where the viscosity of a solution of the resin is increased to a point short of gel formation. Their molecular weight can be controlled by allowing this reaction to proceed to the desired point and then short stopping by dilution with water or by changing the pH. The altering resins are thermosetting when heated, no catalyst being necessary. They are preferably made by short stopping with aqueous hydrochloric acid to give solutions in which they are soluble at a pH of say 9.5. They can be added to the water dispersed fibers with or without other solvents such as isopropanol, methyl ethyl ketone and acetone. Low or high viscosity solutions can be used.

The most effective altering resins for the purpose of the invention are: (1) those containing a lipophilic group of at least six carbon atoms; (2) those containing a substantial quantity of epoxide groups; and (3) those having a relatively high molecular weight. The altering resins derived from epoxides having alternating aliphatic chains and aromatic nuclei have a built in lipophilic group in the form of the aromatic nuclei. Resins having a substantial quantity of epoxide groups are obtained by adding a polyepoxide to a previously formed precondensate or adduct of a polyepoxide and a polyalkylene polyamine. Resins having a relatively high molecular wieght are obtained by using formaldehyde, para-formaldehyde, or other formaldehyde liberating compound to combine molecules of the lower molecular weight resins.

The alkylene polyamines used in forming any of the foregoing altering resins contain at least four carbon atoms. Examples of such polyamines are butylene diamine, hexamethylene diamine, diethylenetriamine, triethylene tetramine, tetraethylene-pentamine, dipropylene-triamine, and the like. Ethylene diamine and propylene diamine give oxirane resins which when applied to water dispersed cellulose fibers in a pulp beater impart wet strength to such fibers but such resins do not impart the desired affinity for anionic and non-ionic resins.

Specific examples of polyepoxides suitable for making oxirane resins suitable for the practice of the invention are compounds having the following formulae:

(Epoxidized dihydroxydiphenyldimethylmethane)

(1)
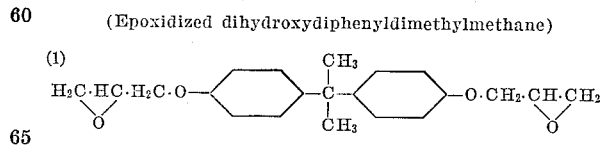

(Glycidyl ether resins)

(2) 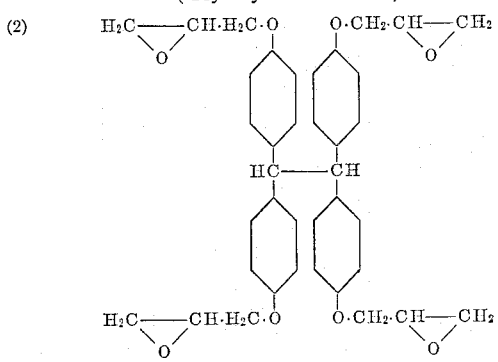

(Butadiene diepoxide)

(3) 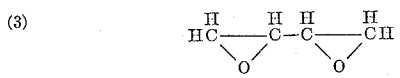

(Epoxy Novolac resins)

(4) 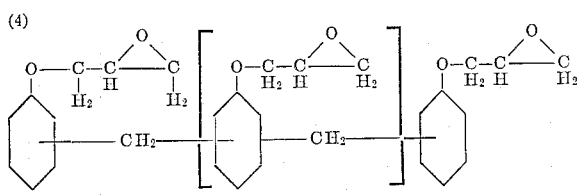

The initial reaction to form an adduct or precondensate between two moles of polyamine and one mole of polyepoxide is normally exothermic. Sometimes gentle heating is used to start the reaction. Solvents are not ordinarily used in this stage and the reaction is carried out under substantially anhydrous conditions. The temperatures are usually within the range of 120° F. to 350° F. The resultant adducts still contain some available epoxy groups (oxirane rings). For example, an adduct made from two moles of tetraethylene pentamine and one mole of Epon 828 (a commercial epoxidized dihydroxydiphenyldimethylmethane having an average epoxide equivalent of 175 to 210) had an epoxide equivalent of 2150 on a dry basis. The "epoxide equivalent" is the number of grams of resin containing one gram equivalent of epoxide.

Resins having a substantially greater proportion of epoxide groups are made by a second addition of the same polyepoxide (or a different polyepoxide) after the exothermic reaction between the polyamine and the initial polyepoxide. In this stage, the reaction can be carried out at room temperature and a solvent or diluent is preferably used to control the reaction. Isopropanol and methylethyl ketone are examples of preferred solvents. The reaction temperature is preferably below the boiling temperature of the solvent. For example, where isopropyl alcohol is used as the solvent, a reaction temperature of about 140° F. is normally employed. Another preferred solvent is methyl ethyl ketone. Higher boiling solvents, such as xylene, have also been used and with such solvents the process can be carried out at a higher temperature without evaporating the solvent. In general, however, it is preferred to use a water miscible solvent or one which is at least partly water miscible, otherwise the presence of the solvent introduces a cloudy appearance when the product is mixed with water.

The first stage of the reaction between the polyamine and the polyepoxide is usually continued until the elevated temperature, due to the exothermic nature of the reaction, subsides. In the second stage the higher the temperature the shorter the time of reaction. In other words, a longer period is required to carry out the reaction at 70° F. than at 140° F. and the time is determined by the time required to produce incipient gelation.

The reaction is stopped in the second stage by any one of a number of expedients, such as, chilling, dilution and treatment with an acid. Treatment with an acid is the preferred method. Various acids may be used but it is preferable to use hydrochloric acid. The epoxidized precondensates can be characterized as being soluble in 2.5% by weight hydrochloric acid at 20° C. In connection with stopping the reaction it should be noted that dilution with water will slow down the reaction but a reduction in pH by the addition of an acid is desirable to stop the reaction completely, otherwise a slow reaction will continue and precipitate will form in the aqueous slurry. Acids which ionize to give monovalent anions are preferred, including hydrochloric, acetic and propionic acids. The reduction in pH can be stopped while the product is still on the alkaline side, for example, at pH 8, or it can be continued until the product is on the acid side. The pH of the product does not appear to be a factor in its subsequent reactions with cellulose and products having a pH from 2 to 12, where the pH has been adjusted with either caustic soda or hydrochloric acid, have reacted satisfactorily with cellulose.

The control of the reaction between the polyamine and the polyepoxide is subject to variation. The initial union of the polyepoxide with the polyamine is exothermic and very rapid. The reaction goes easily and a minimum of control is needed. The products of the exothermic reaction are thermoplastic and water soluble. In the second stage, that is the epoxidation of the precondensate, the reaction proceeds more slowly and it is normally desirable to control the second reaction to produce water soluble resins and to stop the reaction by chilling and dilution prior to gelation or at the point where the viscosity has increased to incipient gelation. At the point of incipient gelation the resin will form a string on a glass stirring rod. If precautions are taken to stop the reaction quickly, the epoxidized precondensates can be formed in one step rather than two steps. It is difficult, however, to prevent gelling in a one step process due to the exothermic nature of the process. The nature of the solvent used in the second stage is also a factor in the speed of the reaction. The time required to reach incipient gelation is shorter with isopropanol than with methyl ethyl ketone. When formaldehyde is used, it reacts rapidly and the reaction mixture is reacted only long enough to produce incipient gelation.

The concentration of the reactants is also a factor. The reaction is normally carried out in all stages at a concentration greater than 50% total reactants (exclusive of solvents) and the product is diluted when the reaction is stopped. This dilution is preferably such that the product as added to the aqueous slurry of fibers has a concentration of 10% to 20% total solids. This has been varied considerably. For storage of twenty-four hours or longer the total solids is preferably 2.5% to 10% by weight of the product.

The consistency of the aqueous slurry to which the altering resin solution is added (weight of fiber to total weight of fiber plus water) is usually 0.5% to 6% but higher consistencies can be used.

From the foregoing discussion it will be seen that the altering resins used for the purpose of the invention are hydrophilic. They are also cationic due to the presence of salt forming amino groups. They preferably have an epoxide equivalent from about 200 to 2000 based on dry resin. Where formaldehyde is used in their preparation they preferably are made with at least one HCHO group per molecule and contain at least one methylol group per molecule. The formaldehyde at least doubles the molecular weight and also provides methylol groups which are reactive with certain resins, e.g., phenolic resins.

The quantity of the altering resin added to an aqueous slurry of fibers (e.g., a slurry of cellulose fibers) will vary depending upon the particular resin but, in general, is within the range of 0.5% to 5%, by weight of the fibers.

Polyester resins are capable of reacting with the previously applied coating of these altering resins. The hydrocarbon resins contain no such free acid groups. It is evident, therefore, that their affinity for the altering resin coating must be based upon the lipophilic character of the coating. The resins employed as altering resins herein contain lipophilic groups and the necessary oil wettability so that these resins have an affinity for hydrocarbon resins, such as, for example, polystyrene. However, after the cellulose fiber or other anionic fiber has been treated with an altering resin followed by a polyester resin, it is sufficiently oil wettable to accept a polystyrene resin or other hydrocarbon resin.

In order to provide a permanent altering effect it is desirable to heat the altering resin and water dispersed cellulose to a temperature within the range of 140° F. to 200° F. This causes a reaction to take place with the cellulose through the oxirane ring. The altering resin cannot then be removed from the cellulose and if the altering resin contains a highly developed lipophilic group (e.g., a lipophilic group having a molecular weight of at least 150 as contributed by the bis-phenol of a polyepoxide), it is attached to the cellulose or other anionic fiber. This heat reacted fiber will accept polystyrene from a xylol-naphtha solution of polystyrene while fibers treated with a resin containing a less highly developed lipophilic group will not.

The present invention makes it possible to alter the characteristics of cellulose fibers or other anionic fibers so that a slurry of such fibers coated with the altering resin can be mixed directly, for example, in a pulp beater, with an organic solvent solution of an anionic resin, such as a polyester resin, or a non-ionic resin, such as a hydrocarbon resin. Examples of anionic or non-ionic resins which can be added to the altered fibers in accordance with the present invention are the polyester resins (anionic) and the hydrocarbon resins (non-ionic). These resins normally lack affinity in the presence of water for anionic fibers, such as cellulose. They normally tend to form globules and collect on the sides of the equipment rather than on the fibers, or if they become associated with the fiber they are very readily removed from it.

The term "polyester resin" as used herein is intended to cover a resin made by reacting a polyhydric alcohol and a polybasic acid or acid anhydride and containing unsaturated components which are capable of cross linking when the resin is cured. Usually at least a portion of the acid component is maleic anhydride. The polyhydric alcohol-polybasic acid composition is added to 10 to 40% by weight of a monomeric aryl vinyl compound, such as styrene or vinyl toluene. For example, a relatively rigid or non-flexible resin can be prepared by reacting 2 moles of ethylene glycol with 1 mole of phthalic anhydride and 1 mole of maleic anhydride for 2 to 4 hours at a temperature of 160° C. in an inert atmosphere such as nitrogen, carbon dioxide or illuminating gas and then adding to the resultant product 10 to 40% monomeric styrene. The resin in this form is liquid and usually has an acid number around 10 to 50. When this liquid resin is heated with a curing catalyst a solid, infusible resin is formed.

Suitable catalysts are the organic peroxides which are soluble in the hydrophobe or resin phase, e.g., benzoyl peroxide, acetylbenzoyl peroxide, cumene hydroperoxide, para-tertiary butyl perbenzoate, and other oil soluble oxygen supplying catalysts.

Other ethylene or propylene glycols, including polyethylene and polypropylene glycols, can be used instead of ethylene glycol provided they produce water insoluble polyesters. Other dicarboxy acids can be used, e.g., adipic acid is a good flexiblizer.

Instead of styrene other monomeric aryl compounds having an unsaturated side chain can be employed, e.g., vinyl toluenes, vinyl naphthalenes, vinyl ethyl benzenes, alpha methyl styrene, vinyl chlorobenzenes, vinyl xylenes, divinyl benzene, divinyl toluenes, divinyl naphthalenes, divinyl xylenes, divinyl ethyl benzenes, divinyl chlorobenzenes, divinyl-phenyl vinyl ethers and diallyl phthalate. Lower boiling monomers such as vinyl acetate usually are not satisfactory because of the reaction which takes place when the resin is cured is very exothermic and the heat would drive off low boiling monomers.

The hydrocarbon resins include polystyrene, styrene butadiene copolymers (high impact polystyrene), petroleum resins, especially dicyclopentadiene (e.g., Panarez). The invention is especially suitable for bonding such materials as asphalt, gilsonite, or mineral spirits soluble vinyl aromatic-olefinic interpolymers (Oroprenes) to anionic fibers such as cellulose. Mixtures of these hydrocarbon resins may be applied simultaneously to the altered cellulose fiber. Phenolic resins can be applied to the altered fibers either alone or in conjunction with hydrocarbon resins or polyester resins.

Oleoresinous varnishes can also be added to cellulose or other anionic fibers in the presence of water and in the form of solutions of such varnishes in organic solvents.

The organic solvents used in the addition of the anionic or non-ionic resins include such solvents as acetone, methylethyl ketone, naphtha, styrene, benzene, toluene, xylene and mixtures of water insoluble solvents and water soluble solvents, such as, for example, methylisobutyl ketone and acetone.

The quantity of organic solvent used to dissolve the resin is subject to variation and the quantity of resin in the solvent solution may vary from 1% to 95%, depending upon the particular resin. The main purpose of the solvent is to provide fluidity and the solvent solution should have sufficient fluidity so that it can be poured into a pulp beater. In general, heavy resin solutions are preferred but there must be sufficient solvent present to permit proper mixing of the resin with the altered fiber.

The mixing of the solvent solution of the resin with the altered fiber in an aqueous slurry can be carried out at ordinary temperatures (70° F.) or at higher temperatures, for example, 140° F. to 200° F.

In order to evaluate the invention a test was devised in which cellulose was altered with an altering resin as described herein and pigmented oil soluble resin solutions were poured into an aqueous slurry containing the altered cellulose fibers.

The slurry was then mixed vigorously for ten minutes. The colored fiber was then examined and rated according to the following scheme. A high number indicates good efficiency in bonding the resin to the fiber.

(1) Colored resin is immediately centrifugally thrown to beaker walls. None on fiber.

(2) Colored resin appears in fiber as coarse drops.

(3) Colored resin appears in fiber as fine drops.

(4) Color appears to go smoothly on stock, but 10 minutes mixing shows resin on beaker at stirrer level.

(5) Colored resin appears to go on stock but on pressing and drying a pad, color is seen to be weak and under the microscope is found to be in fine drops.

(6) Colored resin goes on stock to give a bright smooth color which is maintained on drying a pad.

In the foregoing test a well known commercial cationic methylol melamine resin rates 4 on the scale given when used at a concentration of 3% by weight of the fibers. It is considered that this resin only does half what is desired. It reduces the charge on the cellulose fiber but does not impart oil wettability that is necessary for complete effectiveness.

A typical fatty amine, such as dodecylamine, when used at a concentration of 3% by weight of the cellulose also rates 4 in the test. This amine, and other similar amines, have a certain directing action that will make resins add to an anionic fiber to some extent, i.e., a preliminary good distribution of colored resin on the fiber in the test will be followed by resin globules reforming and being thrown out on the sides of the beater.

The following examples are given to illustrate various modes of practicing the invention. In these examples the quantities are stated in parts by weight unless otherwise indicated.

*Example I*

710 grams of Epon 828 and 720 grams of tetraethylene pentamine were allowed to react exothermically until the reaction had subsided.

1430 grams of the resultant adduct were then dissolved in 1070 grams of methylethyl ketone and 357 grams of Epon 828 were added giving a resin solution containing 62.5% total solids. This was allowed to stand or ripen at 130° F. for 30 minutes and samples were taken from the ripening solution at intervals during this time. 600 gram samples of the ripening solution were dissolved in each case in 1500 grams of water to which had been added 150 grams of 28% hydrochloric acid. The resultant aqueous solutions therefore contained 16.7% resin. The viscosity increased on ripening as shown by the following table.

TABLE I

| Sample | | In Methylethyl Ketone, Centipoises at 130° F. (62.5% Total Solids) | In Water, Centipoises at 85° F. (16.7% Total Solids) |
|---|---|---|---|
| A | Adduct | | 18 |
|   | 2nd addition | 120 | |
|   | 2nd addition, 5 Minutes at 130° F. | 125 | |
|   | 2nd addition, 12 Minutes | 160 | |
|   | 2nd addition, 21 Minutes | 220 | |
| B | 2nd addition, 30 Minutes (Clear point) | 300 | 28 |
| C | 2nd addition, 38 Minutes | 500 | 30 |
| D | 2nd addition, 45 Minutes | 840 | 34 |
| E | 2nd addition, 51 Minutes | 1,350 | 38 |
|   | 2nd addition, 65 Minutes | Off range | |

Resins containing formaldehyde were also prepared by adding formalin solution (37% formaldehyde in water) to the initial adduct of the Epon 828 and tetraethylene pentamine using a ratio of 1 gram of formalin solution to 2 grams of tetraethylene pentamine. In this way, products F, G, H, I and J were obtained by adding Formalin solution to Samples A, B, C, D and E. These products had the following viscosities.

TABLE II

In water centipoises at
Formalin— 85° F. (14.8% solids)
F ------------------------------------------- 18
G ------------------------------------------- 28
H ------------------------------------------- 30
I ------------------------------------------- 40
J ------------------------------------------- 48

The A to E resins had the epoxide equivalents shown in the following table as determined by infrared analysis.

TABLE III

| Sample | Percent Epon 828 | Epoxide Equivalent |
|---|---|---|
| A | 8.75 | 2,150 |
| B | 17.0 | 1,100 |
| C | 14.4 | 1,300 |
| D | 12.8 | 1,360 |
| E | 11.2 | 1,680 |

The cellulose altering ability of these resins was then determined in the manner previously described and the following results were obtained.

TABLE IV

| Percent Altering Resin on Dry Weight of Cellulose | 120° F. | 180° F. |
|---|---|---|
| 0.0 (control) | 1 | 1 |
| 1.5 A | 3 | 3 |
| 7.5 A | 4 | 5 |
| 1.5 B | 5− | 5 |
| 1.5 C | 5+ | 6 |
| 1.5 D | 5+ | 6 |
| 1.5 E | 5+ | 6 |
| 1.5 F | 3 | 3 |
| 5.0 F | 5 | 6 |
| 1.5 G | 6 | 6 |
| 1.5 H | 6 | 6 |
| 1.5 I | 6 | 6 |
| 1.5 J | 6 | 6 |

It will be observed from Table IV that the original adduct A was not effective on the same weight basis as compared to the resin obtained by a second addition of the polyepoxide. The resin B which has been ripened to the stage where it is clear in acid solution, showing that the diepoxide has all been bound into the cation, is not as effective at this stage as it is after further molecular growth, in C, D or E. The overall beneficial effect of heating the pulp beater was clearly visible.

In Table IV the resin added to the altered cellulose was a polyester resin which was colored so that the effects obtained would be visible.

The polyester resin solution was prepared by mixing together

Grams
Polyester resin (Reichhold 8039) ------------------ 300
Polyester pigment paste (Stantone) -------------- 30

The cellulose fibers in the foregoing tests were prepared by opening 15 grams of bleached kraft under a stirrer in 1500 grams of water while heating to 170° F. The indicated amounts of altering resin based on the dry weight of the cellulose were then added and the mixture heated at the indicated temperatures for ten minutes. The polyester resin solution (15 grams) was then added at 140° F. and the mixture stirred with a mechanical stirrer for another ten minutes. The fibers were then felted and the felted product was oven dried at 350° F. The dry pad is capable of showing poor dispersion and uneven coloration. Reichhold 8039 is made by Reichhold Chemical Company and has a viscosity of 2700–3620 centipoises at 77° F. The polyester resin in its fusible state contains styrene as a solvent. The polyester resin solution can also be prepared by adding 45 grams of xylol and 45 grams of methyl ethyl ketone to 300 grams of polyester resin and 35 grams of polyester pigment paste.

*Example II*

(a) 410 grams (4 moles) diethylene triamine was mixed with 780 grams (2 moles) of Epon 828 (a diepoxide produced by Shell Chemical Company) and heated to 120° F. The exotherm took the temperature to 250° F. When the material had cooled to 160° F. it was dissolved in 2000 grams of methyl ethyl ketone and 400 grams of Epon 828 added. The solution was held at 160° F. for ½ hour until the viscosity increase indicated incipient gelation. The solution was then stirred into 5000 grams of water plus 800 grams of 28% hydrochloric acid. The pH of this resin solution was 6.

(b) The following material was opened in a breaker at 180° F.:

Pounds
Unbleached kraft ------------------------------- 25
Paper maker's rag ------------------------------ 10
Shredded wood --------------------------------- 10
One inch fiberglass ----------------------------- 5

To this was added 1 pound (dry basis) of the resin of Example II (a) to alter the fiber to oil and solvent wetting. 19 pounds of phenol formaldehyde resin (Resinox 594) at 65% total solids was dissolved in 15 pounds of methyl isobutyl ketone and poured into the mixing breaker. In five minutes the resin had beaten onto the fiber and the breaker (at 4% consistency) was chilled and diluted and pumped to a stock chest at 1% consistency (1% by weight fiber in water). The stock was next pumped to a felting tank at ½% consistency and felted into luggage preforms. These were pressed and die dried at about 100 pounds per square inch (p.s.i.) and 450° F.

Test pads dried at 50 p.s.i. showed 7000 breaking flexural and 6 unnotched Izod impact. A luggage shell showed the following:

| | Density | Flexural, p.s.i. | Impact | 24 Hour Water, Percent | Swelling, Percent |
|---|---|---|---|---|---|
| Side | 0.9 | 15,700 | 6.4 | 30 | 6 |
| Top | 0.9 | 11,300 | 4.5 | 45 | 8 |

This demonstrates the ability of the resin of the invention to make fiber take a solvent dissolved resin.

*Example III*

(a) 20 grams of tetraethylene pentamine (0.10 mole) was mixed with 20 grams (0.053 mole) of Epon 828 and heated to 130° F. The exotherm carried the temperature to 250° F. After cooling to 160° F. 10 grams of Epon 828 was added and heating continued to incipient gelation. The resin was then dissolved in 100 grams of water and 20 grams of 28% by weight hydrochloric acid. The pH was 9.0. 20 grams of Formalin solution were added to this product to produce a formaldehyde condensation product of the adduct of the diepoxide and the polyamine.

(b) The resins of the invention can be used to produce beautifully even colored fibers. 10 pounds of cut sisal fiber was stirred in 40 gallons of water at 140° F. and 90 grams of the formaldehyde resin of Example III(a) poured into the water. This was followed by 500 grams of polyester resin (Reichhold 8039) containing 50 grams of pigment red polyester paste and catalyzed with 1% benzoyl peroxide, ½% cobalt drier and 1% methyl ethyl ketone peroxide. After the stirring had distributed the color evenly on the treated fibers, the temperature of the water was raised to 180° F. and the polyester resin cured. This eliminated the stickiness of the fiber.

Different color batches were made and mixed. These were dispersed with beaten white kraft pulp, felted and die dried into phonograph cabinets.

In a similar manner, the process can be used to dye cloth, in particular, by printing the resins of the invention on cloth, agitating in an aqueous slurry containing pigmented lipophilic resin and curing, if necessary.

*Example IV*

A block of pulp containing a shaped cavity on one side was pressure felted from 50 unbleached northern kraft and 50 shredded wood. This was dried in an oven and used to protect glass goblets for shipping.

It was found necessary to increase the strength of the package so that it would bear at least 100 pounds without crushing. Dipping with dilute oleoresinous material dissolved in naphtha satisfied the requirements, but was not feasible to carry out. The mass of pulp absorbed large quantities of the dilute varnish, making this an extreme explosion hazard in the oven as the solvents came off.

It was found possible to incorporate 5% of the oleoresinous varnish by pouring a 75% total solids solution into the stock in the beater after first adding 1% of the resin of Example II(a). With this resin (but not without) the varnish beat onto the stock easily. After felting, oven drying, and curing, hard blocks of pulp which more than satisfied the shipping requirements were obtained.

*Example V*

(a) 20 grams of tetraethylene pentamine (0.10 mole) was mixed with 20 grams (0.053 mole) of Epon 828 and heated to 130° F. the exotherm carried the temperature to 250° F. After cooling to 160° F. 10 grams of Epon 828 was added and heating continued to incipient gelation. The resin was then dissolved in 100 grams of water and 20 grams of 28% by weight hydrochloric acid. The pH was 9.0. 10 grams of Formalin was added to the resultant resin solution to produce a formaldehyde condensation product.

(b) 15 pounds of southern kraft, 5 pounds of ground wood, 3 pounds of sulfite and 2 pounds of cotton linters were opened in a beater and then, with the roll "brushing" the bed plate beaten until Williams' freeness was 120 seconds. 1% of the altering resin of Example V(a) was added to the beaten stock and the mixture heated to a temperature of 180° F. with a steam hose. At this temperature it was observed that the fibers took the colored test resin readily. The stock was cooled to 120° F. and 5 pounds of a 50% total solids oleoresinous varnish was poured in. The varnish solvent was mineral spirits. The solids portion consisted of ⅓ raw tung oil, ⅓ rosin and ⅓ of a hard petroleum resin. As the stock was stirred, it was observed that the varnish went onto the fiber, leaving clear water. The stock felted without sticking either on the felter or on drying forms. Two hours in the oven at 300° F. or two days air drying were required to complete the cure of the varnish, after which the products were highly water repellent and wet strong.

*Example VI*

200 grams of bleached kraft was opened in 15,000 grams of water at 180° F. and treated with 2% of the resin of Example II(a) (based on the cellulose) and the stock allowed to cool to 120° F.

A pigmented resin solution was made by grinding on an ink mill

| | Grams |
|---|---|
| Uncured polyester resin (Reichhold 8039) | 1000 |
| Magnetic iron oxide (IRN–110) | 600 |

As required, solvent was added to keep the viscosity within bounds. Final composition of the mix included 300 grams methyl ketone and 200 grams xylol. The pigmented resin was catalyzed before use with 1% benzoyl peroxide, ½% cobalt dried and 1% methyl ethyl ketone based on the polyester resin.

200 grams of the catalyzed pigmented resin was slowly added to the virorously stirred cellulose slurry at 120° F. with smooth deposition on the fibers and the temperature taken to 180° F. The polyester resin cured at this temperature, as was shown by the disappearance of tackiness in the stock. The fibers were colored brown and the water was clear. Portions of the stock were dried and found to be vigorously attracted by a magnet. Dilute dispersions could be stirred by rotating a magnet under a beaker containing the dispersion.

*Example VII*

The altering resin was made by heating 30 grams of tetraethylene pentamine with 30 grams of Epon 828. After the reaction had subsided the mass was dissolved in 100 grams isopropyl alcohol and 10 grams of Epon 828 added. This was held at 150° F. for 20 minutes until viscosity buildup indicated gelation. It was then dissolved in 200 grams of water and 18 grams of 28% by weight hydrochloric acid. The resin was diluted to 10% solids for storage.

20-gram portions of bleached kraft were opened in 1500 grams of water at 120° F. 2.5% of the dry resin, based on the cellulose, was added (0.5 gram dry or 5 grams wet), and the pH was adjusted with 5% caustic soda or 5% hydrochloric acid. The temperature was taken to 180° F. The stock was then filtered out and worked up in 1500 grams, 120° F. fresh water and the pH adjusted to 7. 5 grams of the colored polyester resin was added with vigorous stirring and this was continued for 10 minutes. Pads were felted and rated as described in Example I.

The results were as follows:

Reacting pH of the
altering resin:  Rating
2 ------------------------------------ 6
5 ------------------------------------ 6
7 ------------------------------------ 6
9 ------------------------------------ 6
10 ----------------------------------- 6
12 ----------------------------------- 6

*Example VIII*

The following cellulose stock was dispersed in a breaker at 145° F.

Ground wood ---------------------- sheets -- 10
Northern kraft -------------------- do ---- 50
Blue rag ---------------------------- pounds -- 40
Shredded wood -------------------- do ---- 40

The stock was altered to oil wetting by adding 2½ gallons of reagent (1). Reagent (2) was then added. After this was well mixed, caustic soda dissolved phenolic (3) was added and then precipitated with acid. The batch was diluted with cold water and pumped to a stock chest.

A molded luggage shell made from this stock had a density of 0.82 to 0.9 gram per cc. flexural top 8700 p.s.i., impact 5.7, flexural side 8400 p.s.i., impact 5.3, and 24 hour water pickup 33%. This shell held water 5 days without weakening or leaking at which time the test was ended.

The reagents (1), (2) and (3) were made as follows:

(1) 600 grams tetraethylene pentamine was heated with 600 grams Epon 828 and allowed to exotherm. This was dissolved in 1500 grams isopropyl alcohol and 300 grams of Epon 828 was added. The solution was held at 120° F. for ½ hour until bodied and diluted with water and 600 grams 28% by weight hydrochloric acid to 5 gallons, and 300 grams Formalin added.

(2) 7 pounds crude dicyclopentadiene resin (Panarez 7-70) at 70% total solids, and 23 pounds of scrap polystyrene at 44% total solids in xylol and naphtha mixed together in equal parts.

(3) 480 grams caustic soda dissolved in ½ gallon of water and stirred with 16 pounds phenol-formaldehyde resin (Resinox 594) and 4 pounds isopropyl alcohol.

The acid precipitation of the phenolic was affected by adding to the breaker 1450 cc. of 28% by weight hydrochloric acid. Conventional defoaming agents (decyl alcohol, tributyl phosphate and Dow Corning antifoam B) were used to control the foaming.

The resultant altered cellulose contains 1% altering resin (epoxized precondensate), 3% dicyclopentadiene, 5% polystyrene and 7% phenolic based on the dry fiber.

Reagent (2) does not distribute on the fiber unless reagent (1) is first used.

*Example IX*

This example illustrates the application of the invention to the altering of cellulose fiber so that it will have an affinity for polystyrene.

The cellulose fiber consisted of 20 grams of bleached kraft cellulose which was opened to form a slurry by mixing in 1500 grams of water.

The altering resin was prepared by allowing 100 grams of tetraethylene pentamine and 100 grams of Epon 828 to react. The product was then dissolved in 250 grams of isopropyl alcohol and 50 grams of Epon 828 was added. The solution was allowed to ripen to incipient gelation at 125° F. The resultant product was then dissolved in 1000 grams of water plus 100 grams of 28% by weight hydrochloric acid and 50 grams of Formalin was added. The product was diluted with water to 10% solids.

4 grams of the altering resin as previously described (2% by weight of the cellulose) was mixed with the slurry of cellulose at 120° F. for 5 minutes, then 10 grams of polystyrene was added. The polystyrene was colored and was prepared by mixing 100 grams of a 44% total solids solution of polystyrene in equal parts of xylol and naphtha with 20 grams of xylol, 130 grams of acetone and 5 grams of oil black dye.

The polystyrene was added to the stirred cellulose slurry containing the altering resin at 120° F. and bonded to the altered cellulose fiber immediately. It retained its affinity for the cellulose fiber as the temperature was raised to 180° F. A very uniform product was obtained.

The colored polystyrene will not attach itself to the untreated cellulose fiber.

*Example X*

The procedure was the same as in Example IX except that 10 grams of uncured polyester thermosetting resin (Reichhold 8039) was added to the mixing slurry of altered cellulose fiber prior to the addition of the polystyrene. The polyester resin attached itself to the altered cellulose fibers immediately and the polystyrene resin readily attached itself to the polyester resin-altered cellulose fiber as mixing was continued.

*Example XI*

Cellulose in an aqueous slurry was altered as described in Example IX by adding an epoxidized precondensate and the slurry was then treated with 10 grams of polyester resin and 1 gram of tall oil fatty acids. The resultant stock when dried showed a pronounced sizing effect.

*Example XII*

(a) An altering resin was prepared by reacting 100 grams tetraethylene pentamine, 100 grams of Epon 828 until the exothermic reaction subsided, then dissolving the adduct in 250 grams isopropyl alcohol, adding 50 grams Epon 828 and ripening the solution to incipient gelation at 125° F. The product was then dissolved in 1000 grams of water, plus 100 grams 28% hydrochloric acid and 50 grams of formaldehyde were added at 70° F. This product was then diluted with water to 10% solids.

(b) 20 grams of bleached kraft was opened with a stirrer in 1500 grams of water. 4 grams of product (a) (2% altering resin on the weight of the cellulose) were added to the opened kraft at a temperature of 128° F. and mixed for 10 minutes. Then 10 grams of polyester solution as described in Example I made from 300 grams of polyester resin, 35 grams of polyester pigment paste, 45 grams of xylol and 45 grams of methyl ethyl ketone were added to the aqueous slurry of cellulose fibers and the temperature was raised to 180° F. The polyester resin went on the fiber and stayed on as the temperature was raised.

(c) The procedure of Example XII(b) was repeated using a polystyrene resin as described in Example IX instead of a polyester resin. Again the polystyrene resin was accepted by the altered cellulose fiber and remained on the fiber as the temperature was raised from 120° F. to 180° F.

This example further illustrates that the epoxidized precondensate of a polyamine containing at least four carbon atoms and a polyepoxide will produce an affinity for both the anionic and non-ionic resins dissolved in organic solvent solutions.

Good results are obtained with 1% by weight of the altering resin based on dry cellulose where the resinous material accepted by the cellulose is a bituminous material such as asphalt or a vinyl aromatic-olefin mineral spirit soluble interpolymer (Oroprene).

Any source of cellulose including wood, cotton, rags, jute, ramie, flax, sisal, caroa or other anionic fibers can be used to form the aqueous slurry of fibers to which the altering resin is added followed by a non-aqueous solution of the anionic or non-ionic resinous material to be bonded to the fibers.

The quantity of the added resinous material can be varied rather widely depending upon the products. The lower limit is usually governed by the minimum amount required to produce a given property. For example, in making hardboard where the final products are compacted or pressed at pressures of 500 p.s.i. or higher, as little as 4% and usually 4% to 10% of added resin is satisfactory, based on the weight of the cellulose. In making die dried molded felted fibrous articles where the articles are die dried at say 50 to 150 p.s.i., higher quantities of added resin, for example, 10% to 25% by weight of the cellulose are usually desirable. The upper limit will usually depend on the specific resin added and the stickiness imparted to the article if it is to be die dried. It has been possible to add 100% of resin based on the dry weight of cellulose. Where die drying is not used and stickiness is not a factor, larger quantities of resin can be added.

It is believed that the effectiveness of these altering resins is due in part to the epoxide content as well as to the molecular weight, the nitrogen content, and the lipophilic group present in these resins. To illustrate, Epon 828 has an epoxide equivalent of 175–210. With 20 grams of tetraethylene pentamine (acting only as a diamine) and 20 grams of Epon 828 having an epoxide equivalent number of 175, the molar ratio would be 2 moles of diamine to 1.08 moles of diepoxide, or for 100 molecules of adduct formed, 8 could be epoxy active. If the adduct were dimerized with formaldehyde, 16 molecules could be active. Addition of 5 grams more of Epon 828 to the adduct would mean that 35 of the resin molecules could be epoxy active, i.e., contain an oxirane ring. Addition of formaldehyde to the second stage resin resulting in dimerization would give 70 epoxy active molecules out of 100 molecules of resin. As ripening progresses (i.e., before formaldehyde addition) inactive molecules are joined to active molecules. Too many epoxy groups introduce difficulties in short stopping the reaction. The water solubility can also be lost by adding too much oil soluble molecules to the cation.

In general, satisfactory altering characteristics in the altering resin have been obtained by reacting a diepoxide with an aliphatic polyamine having at least two reactive amino groups and at least four carbon atoms in a molar ratio of 0.85:1 to 2.5:1.

If formaldehyde is added, it is preferably employed in a molar ratio of at least sufficient to provide one mole of formaldehyde for each two moles of epoxidized adduct, where the term "adduct" refers to the initial product obtained by exothermically reacting two moles of the polyamine with about one mole of diepoxide and the term "epoxidized adduct" refers to the adduct with more epoxide groups added. In general, the quantity of formaldehyde is within the range of 0.5 mole to 30 moles per mole of polyamine. The formaldehyde, as previously indicated, can be added in the form of para-formaldehyde or other formaldehyde liberating compound. The formaldehyde reacts immediately at ordinary temperatures and an increase in viscosity of the solution is evident. Small amounts of formaldehyde result in a partial reaction with the adduct or epoxidized adduct to produce partial cross linking. Large amounts in excess of those amounts required for cross linking react with amino nitrogen to form methylol groups. These increase the water solubility of the altering resin. They are also reactive with some resins such as phenolic resins. In most cases it is preferred to use 8 to 12 moles of formaldehyde per mole of a polyamine such as tetraethylene pentamine.

The term "felting" as used herein refers to the method by which the fibers are removed from the aqueous slurry and broadly includes accreting them on to a porous former to make a shaped article, making a board, or forming a sheet as is done in paper making.

The invention is hereby claimed as follows:

1. A process of bonding anionic fibers in a water dispersed state to anionic and non-ionic resinous materials which do not normally bond to such fibers in water which comprises treating such fibers in water with a minor amount by weight of a cationic hydrophilic altering resin containing an oxirane ring capable of reacting with said anionic fibers, said altering resin being from the group consisting of (1) an epoxidized precondensate of a polyamine containing at least four carbon atoms and a polyepoxide having an epoxide equivalent of at least 43, which epoxidized precondensate has a nitrogen content of at least 9% by weight and (2) condensation products of (1) with at least one mole of formaldehyde per mole of said polyamine, said amount being sufficient to alter said fibers to cause them to bond to said resinous materials, effecting intimate dispersion and reaction of said fibers with said resin, thereafter adding a non-aqueous, non-emulsified fluid form of at least one such resinous material to the resultant aqueous slurry of altered fibers and intimately mixing said resinous material with said altered fibers to cause said resinous material to be bonded to said altered fibers in said slurry, and felting from said slurry an article of said resinous material bonded to said altered fibers.

2. A process of bonding anionic fibers in a water dispersed state to anionic and non-ionic resinous materials which do not normally bond to such fibers in water which comprises treating such fibers in water with a minor amount by weight of a cationic hydrophilic altering resin containing an oxirane ring capable of reacting with said anionic fibers, said amount being sufficient to alter said fibers to cause them to bond to said resinous materials, effecting intimate dispersion and reaction of said fibers with said altering resin, thereafter adding a non-aqueous, non-emulsified fluid form of at least one such resinous material to the resultant aqueous slurry of altered fibers and intimately mixing said resinous material with said altered fibers to cause said resinous material to be bonded to said altered fibers in said slurry, and felting from said slurry an article of said resinous material bonded to said altered fibers, said altering resin being an epoxidized reaction product of an aliphatic polyamine containing at least four carbon atoms and at least two reactive amino groups condensed with a polyepoxide having an epoxide equivalent of at least 43 to form a cationic hydrophilic condensation product having an epoxide equivalent of about 200 to 2000 and a nitrogen content of at least 9% by weight.

3. A process of bonding anionic fibers in a water dispersed state to anionic and non-ionic resinous materials which do not normally bond to such fibers in water which comprises treating such fibers in water with a minor amount by weight of a cationic hydrophilic altering resin containing an oxirane ring capable of reacting with said anionic fibers, said amount being sufficient to alter said fibers to cause them to bond to said resinous materials, effecting intimate dispersion and reaction of said fibers with said resin, thereafter adding a non-aqueous, non-emulsified solution of at least one of said resinous materials to the resultant aqueous slurry of altered fibers and intimately mixing said solution with said altered fibers to cause said resinous materials to be bonded to said altered fibers in said slurry, and felting from said slurry an article of said resinous materials bonded to said altered fibers, said altering resin being an epoxidized reaction product of an aliphatic polyamine containing at least four carbon atoms and at least two reactive amino groups condensed with a polyepoxide having an epoxide equivalent of at least 43 to form a cationic hydrophilic condensation product having an epoxide equivalent of 1100 to 2000 and a nitrogen content of at least 9% by weight and further reacted with formaldehyde in sufficient amount to increase the viscosity of a hydrochloric acid solution of the resultant product, the quantity of formaldehyde being at least one mole per mole of said polyamine.

4. A process of bonding cellulose fibers in a water dispersed state to anionic and non-ionic resinous materials which do not ordinarily bond to such fibers in water which comprises treating such fibers in water with a minor amount by weight of a cationic hydrophilic altering resin containing an oxirane ring capable of reacting with said fibers, said altering resin being from the group consisting of (1) an epoxidized precondensate of a polyamine containing at least four carbon atoms and a polyepoxide having an epoxide equivalent of at least 43, which epoxidized precondensate has a nitrogen content of at least 9% by weight and (2) condensation products of (1) with at least one mole of formaldehyde per mole of said polyamine, said amount being sufficient to alter said fibers to cause them to bond to said resinous materials, effecting intimate dispersion and reaction of said fibers with said resin while heating to a temperature of 140° F. to 200° F., thereafter adding a non-aqueous, non-emulsified solution of at least one of said resinous materials to the resultant aqueous slurry of altered fibers and intimately mixing said solution with said altered fibers to cause said resinous materials to be bonded to said altered fibers in said slurry, and felting from said slurry an article of said resinous materials bonded to said altered fibers.

5. A process of bonding cellulose fibers in a water dispersed state to a polyester resin which does not ordinarily bond to such fibers in water which comprises treating such fibers in water with a minor amount by weight of a cationic hydrophilic altering resin containing an oxirane ring capable of reacting with said fibers, said altering resin being from the group consisting of (1) an epoxidized precondensate of a polyamine containing at least four carbon atoms and a polyepoxide having an epoxide equivalent of at least 43, which epoxidized precondensate has a nitrogen content of at least 9% by weight and (2) condensation products of (1) with at least one mole of formaldehyde per mole of said polyamine, said amount being sufficient to alter said fibers to cause them to bond to said polyester resin, effecting intimate dispersion and reaction of said fibers with said altering resin, thereafter adding a non-aqueous, non-emulsified solvent solution of said polyester resin in its fusible state to the resultant aqueous slurry of altered fibers and intimately mixing said solution with said altered fibers to cause said polyester resin to be bonded to said altered fibers in said slurry, and felting from said slurry an article of said polyester resin bonded to said altered fibers.

6. A process of bonding cellulose fibers in a water dispersed state to a hydrocarbon resin which does not ordinarily bond to such fibers in water which comprises treating such fibers in water with a minor amount by weight of a cationic hydrophilic altering resin containing an oxirane ring capable of reacting with said fibers, said altering resin being from the group consisting of (1) an epoxidized precondensate of a polyamine containing at least four carbon atoms and a polyepoxide having an epoxide equivalent of at least 43, which epoxidized precondensate has a nitrogen content of at least 9% by weight and (2) condensation products of (1) with at least one mole of formaldehyde per mole of said polyamine, said amount being sufficient to alter said fibers to cause them to bond to said hydrocarbon resin, effecting intimate dispersion and reaction of said fibers with said resin, thereafter adding a non-aqueous, non-emulsified solution of said hydrocarbon resin to the resultant aqueous slurry of altered fibers and intimately mixing said solution with said altered fibers to cause said hydrocarbon resin to be bonded to said altered fibers in said slurry, and felting from said slurry an article of said hydrocarbon resin bonded to said altered fibers.

7. A process as claimed in claim 1 in which said resinous material is an oleoresinous varnish.

8. A process as claimed in claim 1 in which said resinous material is dicyclopentadiene.

9. A process as claimed in claim 1 in which said resinous material is a petroleum resin.

10. A process as claimed in claim 1 in which said resinous material is a phenol formaldehyde resin.

11. A process as claimed in claim 1 in which said resinous material is polystyrene.

12. In a process of bonding cellulose fibers in a water dispersed state to polyester resins and hydrocarbon resins which do not ordinarily bond to such fibers in water the steps which comprise treating such fibers in water with a minor amount by weight of a cationic hydrophilic altering resin capable of altering said fibers to a cationic state, said altering resin being from the group consisting of (1) an epoxidized precondensate of a polyamine containing at least four carbon atoms and a polyepoxide having an epoxide equivalent of at least 43, which epoxidized precondensate has a nitrogen content of at least 9% by weight and (2) condensation products of (1) with at least one mole of formaldehyde per mole of said polyamine, said amount being sufficient to alter said fibers to cause them to bond to said polyester resin, effecting intimate dispersion of said fibers with said altering resin, thereafter adding a non-aqueous, non-emulsified solution of a polyester resin to the resultant aqueous slurry of altered fibers and intimately mixing said solution with said altered fibers to cause said polyester resin to be bonded to said altered fibers in said slurry, thereafter adding a non-aqueous slurry of a hydrocarbon resin and intimately mixing said solution with the fibers therein to cause said hydrocarbon resin to be bonded to the polyester coated fibers in said slurry, and felting an article from said slurry of resin treated fibers.

References Cited

UNITED STATES PATENTS

| 1,901,930 | 3/1933 | Pieper | 162—183 |
| 2,601,597 | 6/1952 | Daniel | 162—168 |
| 2,666,038 | 1/1954 | Eisen | 117—76 |
| 2,765,228 | 10/1956 | Jordan | 162—182 |
| 2,772,248 | 11/1956 | Lieberman | 260—29.2 |
| 3,016,325 | 1/1962 | Pattilloch | 162—182 |

DONALL H. SYLVESTER, *Primary Examiner.*

H. R. CAINE, *Assistant Examiner.*